(12) United States Patent
Chien et al.

(10) Patent No.: US 12,393,034 B2
(45) Date of Patent: Aug. 19, 2025

(54) WEARABLE PROJECTION DEVICE

(71) Applicant: Coretronic Corporation, Hsin-Chu (TW)

(72) Inventors: Wei-Min Chien, Hsin-Chu (TW); Tung-Chou Hu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/537,815

(22) Filed: Dec. 13, 2023

(65) Prior Publication Data
US 2024/0219730 A1    Jul. 4, 2024

(30) Foreign Application Priority Data
Dec. 29, 2022 (CN) .......................... 202211709617.1

(51) Int. Cl.
*G02B 27/01* (2006.01)

(52) U.S. Cl.
CPC ..... *G02B 27/0172* (2013.01); *G02B 27/0176* (2013.01); *G02B 2027/014* (2013.01)

(58) Field of Classification Search
CPC ............ G02B 27/0172; G02B 27/0176; G02B 2027/014; G02B 2027/0178; G02B 27/01; G02B 27/017; G03B 21/16
See application file for complete search history.

(56) References Cited

U.S. PATENT DOCUMENTS

| | | | |
|---|---|---|---|
| 9,740,023 B1 * | 8/2017 | Ashwood | G02C 11/10 |
| 10,317,700 B1 * | 6/2019 | Ashwood | G02C 5/143 |
| 10,433,467 B2 | 10/2019 | Hurbi et al. | |
| 10,620,439 B1 * | 4/2020 | Zhang | G09G 3/3603 |
| 11,112,619 B1 * | 9/2021 | Romano | G02C 5/008 |
| 11,493,763 B2 * | 11/2022 | Lee | G02B 27/0172 |
| 11,703,923 B2 * | 7/2023 | Mou | G06F 1/203 |
| | | | 361/679.46 |

(Continued)

FOREIGN PATENT DOCUMENTS

| CN | 215494370 | 1/2022 |
|---|---|---|
| CN | 216979450 | 7/2022 |

(Continued)

*Primary Examiner* — Grant Sitta
(74) *Attorney, Agent, or Firm* — JCIPRNET

(57) ABSTRACT

A wearable projection device includes a main body, an optical-mechanical module, a waveguide module, a first thermally conductive plate, and a control module. The main body has a display portion and a support portion connected to each other. The optical-mechanical module is disposed at the display portion and includes at least one light source. The waveguide module is disposed at the display portion. The first thermally conductive plate is connected to the light source and extends from the display portion to the support portion. The control module is electrically connected to the optical-mechanical module, so that an image generated by the optical-mechanical module is displayed on the display portion by the waveguide module. The wearable projection device is able to increase a heat dissipation area through the first thermally conductive plate, so that the wearable projection device may achieve an improved heat dissipation effect and have an improved display quality.

24 Claims, 15 Drawing Sheets

(56) References Cited

U.S. PATENT DOCUMENTS

| | | | | |
|---|---|---|---|---|
| 11,768,538 | B1* | 9/2023 | Wang | G02B 27/0176 |
| | | | | 345/156 |
| 12,029,014 | B2* | 7/2024 | Yoon | G06F 1/20 |
| 12,111,514 | B1* | 10/2024 | Ashwood | G02C 11/10 |
| 12,189,421 | B2* | 1/2025 | Lin | G06F 1/163 |
| 2012/0235900 | A1* | 9/2012 | Border | G06F 3/017 |
| | | | | 345/156 |
| 2016/0041395 | A1* | 2/2016 | Yajima | G02B 27/017 |
| | | | | 359/630 |
| 2016/0212888 | A1* | 7/2016 | Nikkhoo | G02B 7/008 |
| 2018/0376626 | A1* | 12/2018 | Hurbi | G02B 7/002 |
| 2022/0299781 | A1* | 9/2022 | Ran | G02B 27/0172 |

FOREIGN PATENT DOCUMENTS

| | | |
|---|---|---|
| CN | 113260226 | 8/2022 |
| TW | 202217394 | 5/2022 |

\* cited by examiner

WEARABLE PROJECTION DEVICE

CROSS-REFERENCE TO RELATED APPLICATION

This application claims the priority benefit of China application serial no. 202211709617.1, filed on Dec. 29, 2022. The entirety of the above-mentioned patent application is hereby incorporated by reference herein and made a part of this specification.

BACKGROUND OF THE INVENTION

Field of the Invention

The invention relates to a projection device and particularly relates to a wearable projection device.

Description of Related Art

With the increasing development of science and technologies, types and functions of projection devices and the manner of using the same have become more and more diverse, and wearable projection devices that may be directly worn on bodies of users have also emerged accordingly. At present, the wearable projection device includes three sets of heat sources; namely, a display element, a system on a chip (SoC), and a network module. Since the wearable projection device is in direct contact with the human body, an active heat dissipation element (such as a fan) that generates vibrations and noise cannot be used, while a passive heat dissipation element may be applied to dissipate heat from the heat sources, which significantly limit the heat dissipation capability of the wearable projection device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide a wearable projection device with an improved heat dissipation effect and an improved heat dissipation quality.

Other objectives and advantages of the invention may be further understood from the technical features disclosed in the invention.

In order to achieve one, some, or all of the aforementioned objectives or other objectives, an embodiment of the invention provides a wearable projection device that includes a main body, an optical-mechanical module, a waveguide module, a first thermally conductive plate, and a control module. The main body has a display portion and a support portion connected to each other. The optical-mechanical module is disposed at the display portion and includes at least one light source. The waveguide module is disposed at the display portion. The first thermally conductive plate is connected to the light source and extends from the display portion to the support portion. The control module is electrically connected to the optical-mechanical module, so that an image generated by the optical-mechanical module is displayed on the display portion by the waveguide module.

In view of the above, the wearable projection device provided in one or more embodiments of the invention has at least one of the following advantages or achieves at least one of the following effects. In the wearable projection device provided in one or more embodiments of the invention, the first thermally conductive plate is connected to the light source and extends from the display portion to the support portion. Namely, an area occupied by the first thermally conductive plate is relatively large, whereby a heat dissipation area may be increased. As such, the wearable projection device provided in one or more embodiments of the invention may achieve with an improved heat dissipation effect and have an improved heat dissipation quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
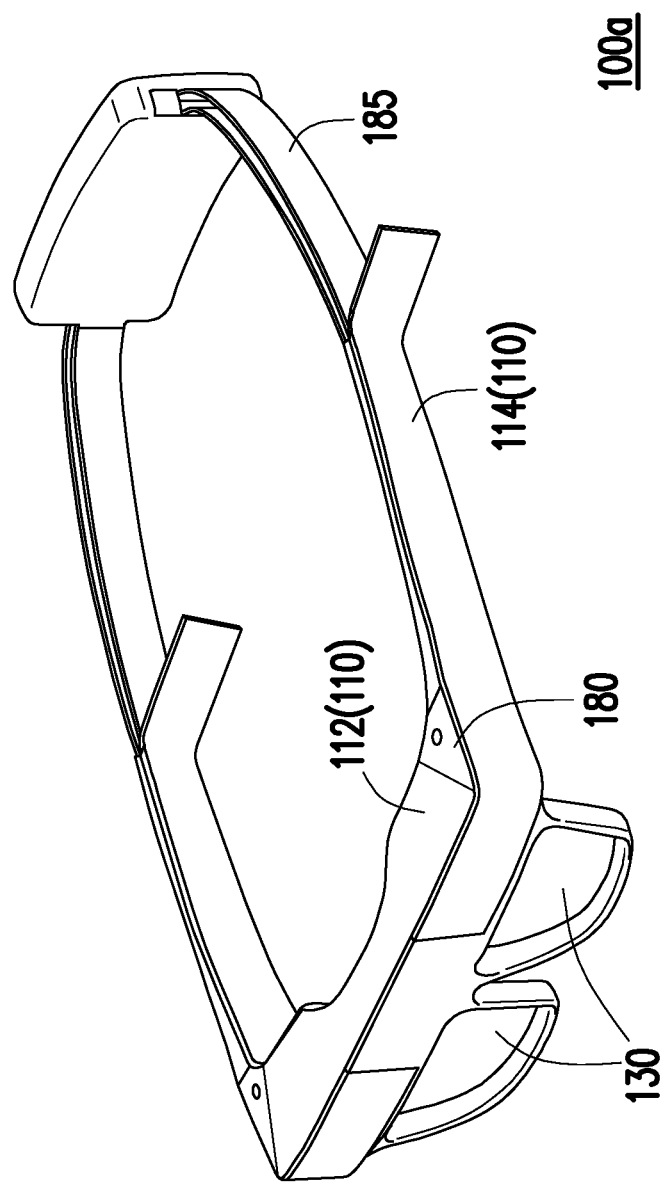
FIG. 1A is a schematic three-dimensional view illustrating a wearable projection device according to a first embodiment of the invention.
Figure 1B:
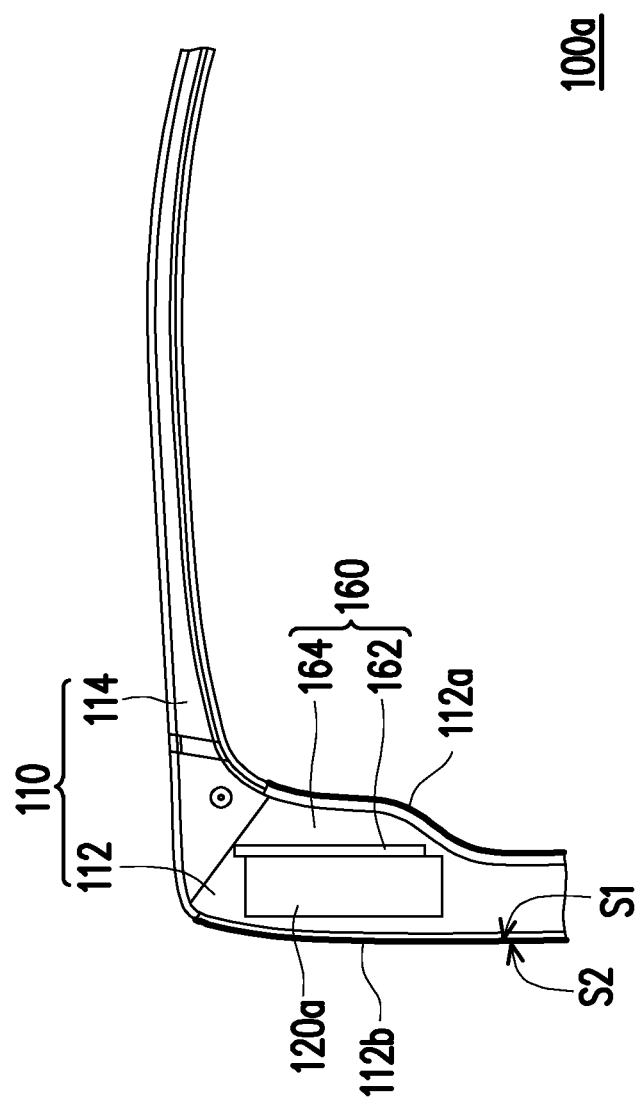
FIG. 1B is a partial perspective top view illustrating a display portion of the wearable projection device depicted in FIG. 1A.
Figure 1C:
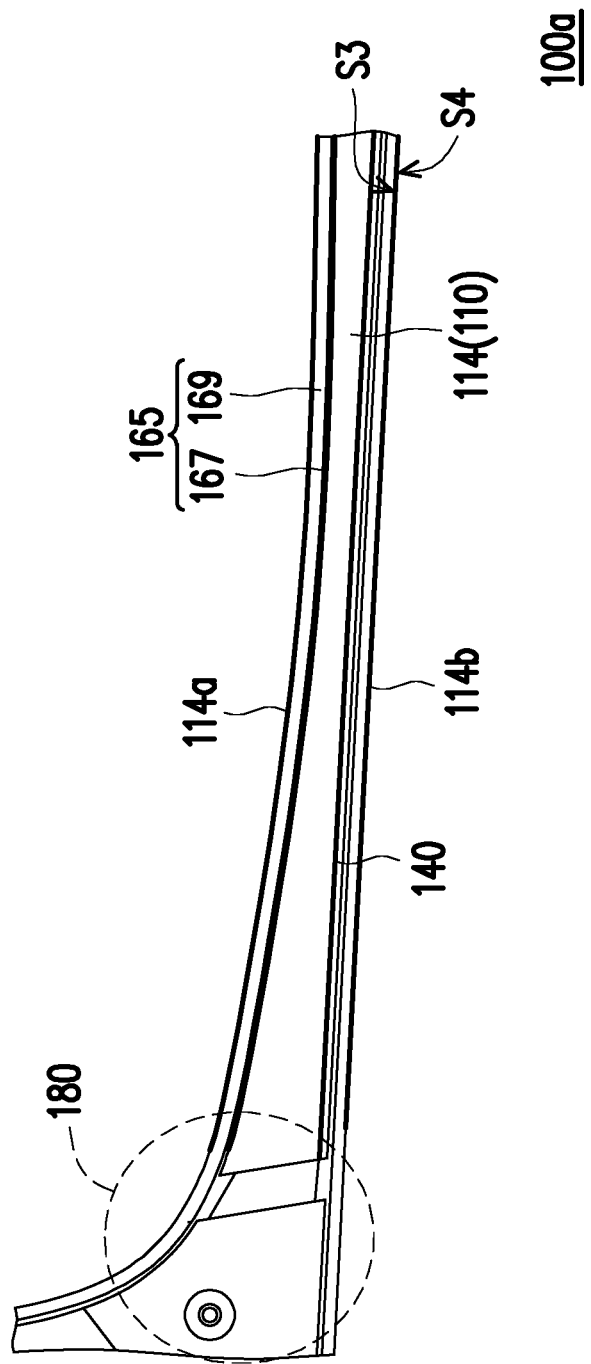
FIG. 1C is a partial perspective top view illustrating a support portion of the wearable projection device depicted in FIG. 1A.
Figure 1D:
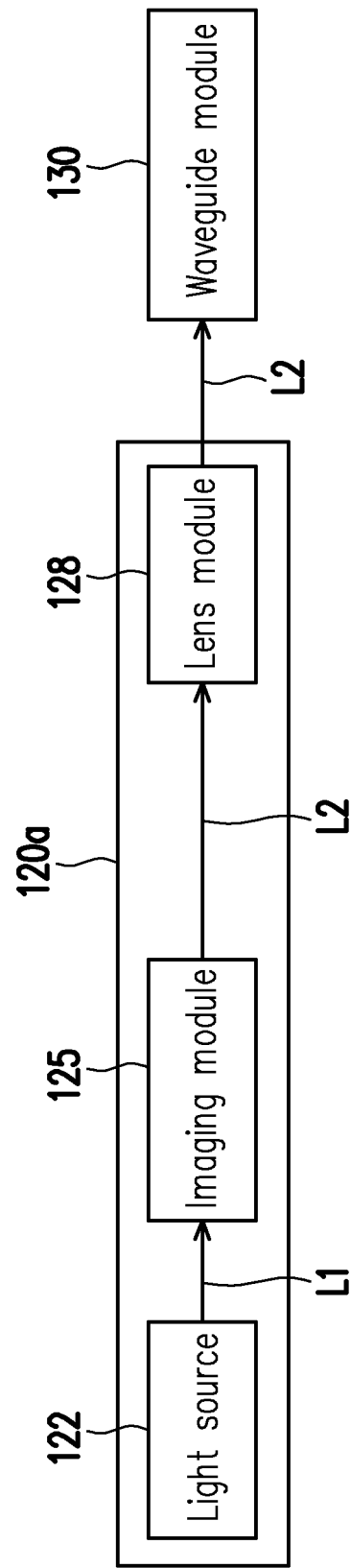
FIG. 1D is a schematic view illustrating an optical-mechanical module and a waveguide module of the wearable projection device depicted in FIG. 1A.
Figure 2A:
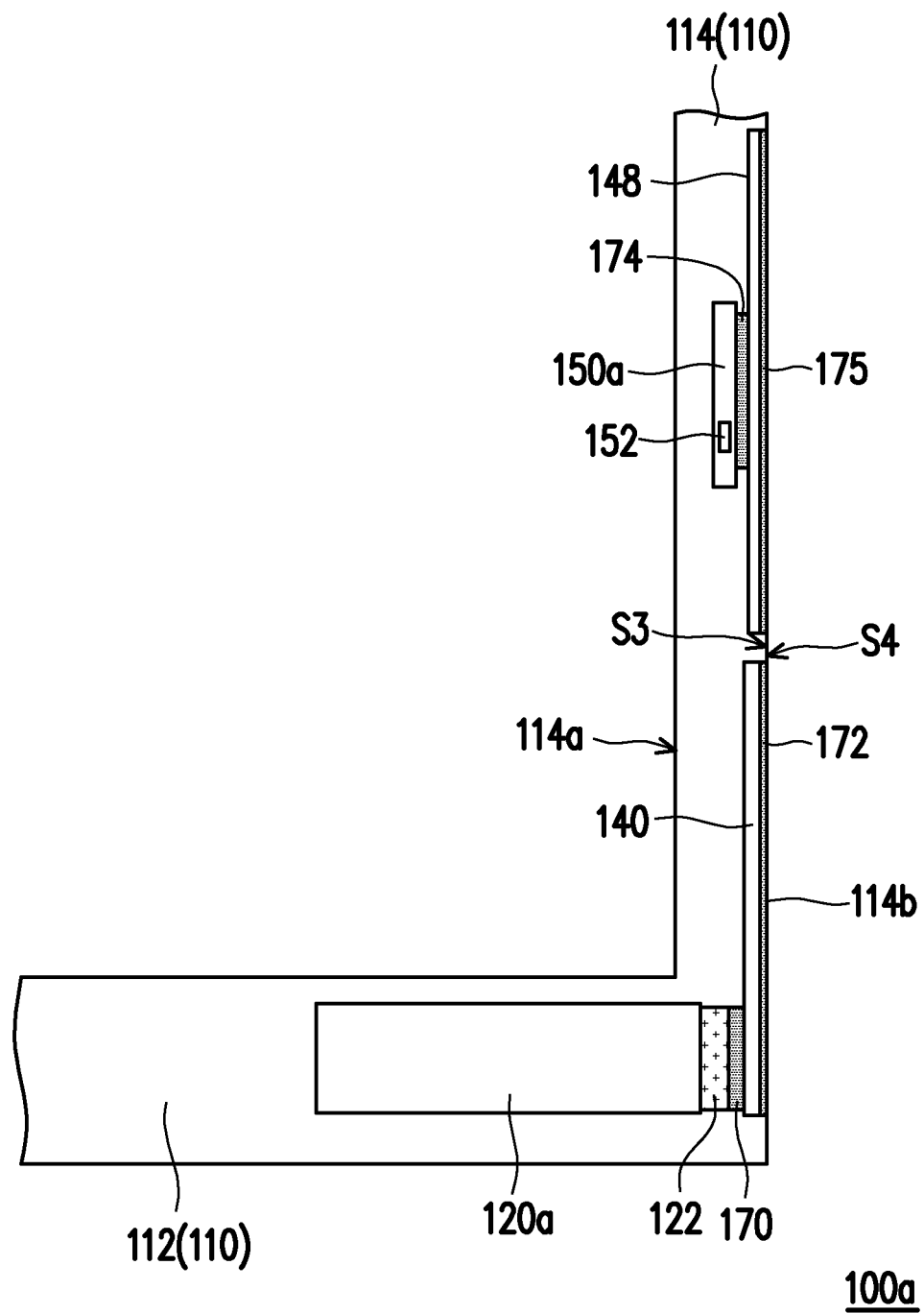
FIG. 2A is a schematic partial perspective top view illustrating the wearable projection device depicted in FIG. 1A.
Figure 2B:
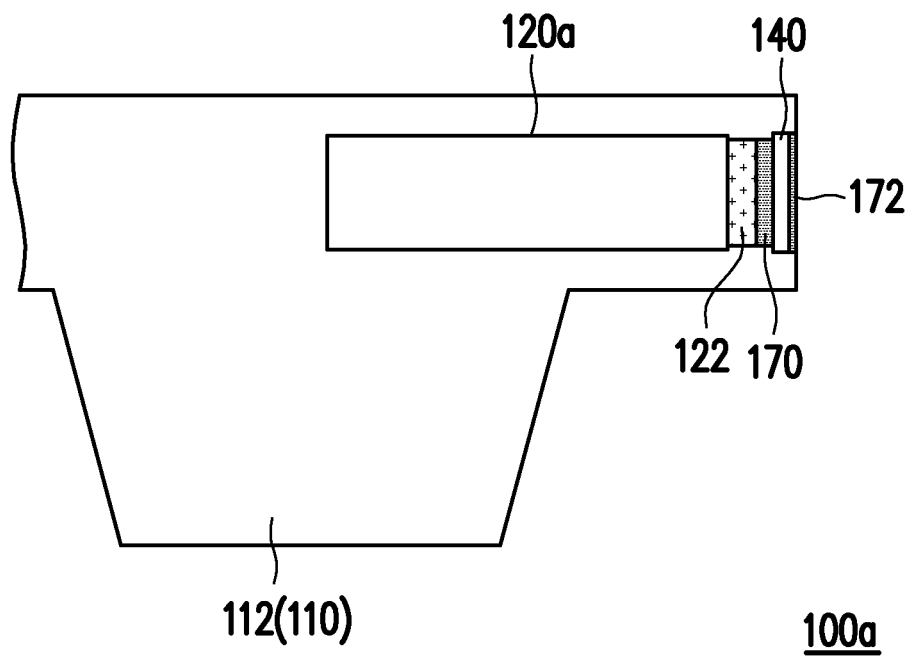
FIG. 2B is a schematic partial perspective front view illustrating the wearable projection device depicted in FIG. 1A.
Figure 2C:
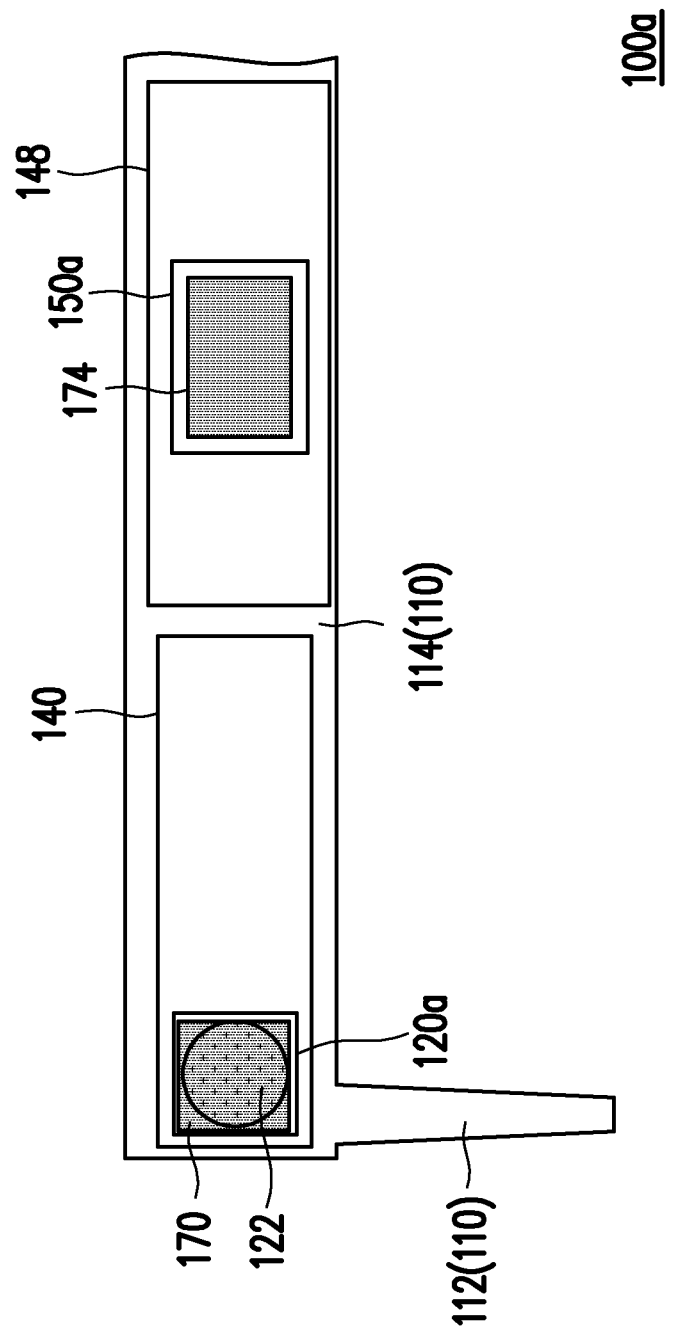
FIG. 2C is a schematic partial perspective side view illustrating the wearable projection device depicted in FIG. 1A.

FIG. 1A is a schematic three-dimensional view illustrating a wearable projection device according to a first embodiment of the invention. FIG. 1B is a partial perspective top view illustrating a display portion of the wearable projection device depicted in FIG. 1A. FIG. 1C is a partial perspective top view illustrating a support portion of the wearable projection device depicted in FIG. 1A. FIG. 1D is a schematic view illustrating an optical-mechanical module and a waveguide module of the wearable projection device depicted in FIG. 1A. FIG. 2A is a schematic partial perspective top view illustrating the wearable projection device depicted in FIG. 1A. FIG. 2B is a schematic partial perspective front view illustrating the wearable projection device depicted in FIG. 1A. FIG. 2C is a schematic partial perspective side view illustrating the wearable projection device depicted in FIG. 1A.

With reference to FIG. 1A, FIG. 1D, and FIG. 2A, in the present embodiment, the wearable projection device 100a includes a main body 110, an optical-mechanical module 120a, a waveguide module 130, a first thermally conductive plate 140, and a control module 150a. The main body 110 has a display portion 112 and a support portion 114 connected to each other. The optical-mechanical module 120a is disposed at the display portion 112 of the main body 110 and includes at least one light source 122 (one light source 122 is schematically shown). The optical-mechanical module 120a is, for instance, a projection device. The at least one light source 122 of the optical-mechanical module 120a is, for instance, a laser light source, a light emitting diode (LED), or an organic light emitting diode (OLED). The waveguide module 130 is disposed at the display portion 112 of the main body 110. The first thermally conductive plate 140 is connected to the at least one light source 122 and extends from the display portion 112 to the support portion 114. The control module 150a is electrically connected to the optical-mechanical module 120a, so that an image generated by the optical-mechanical module 120a is displayed on the display portion 112 by the waveguide module 130. The waveguide module 130 is, for instance, a light transmissive waveguide sheet configured to receive an image beam L2, which allows a user to watch an image generated by the image beam L2. The control module 150a includes, for instance, a microprocessor, an image processor, and so on, which should however not be construed as a limitation in the disclosure.

Specifically, with reference to FIG. 1B, the display portion 112 of the main body 110 has a contact surface 112a and an appearance surface 112b opposite to each other. Here, the contact surface 112a is a surface that contacts the skin of the user when the user wears the wearable projection device 100a, while the appearance surface 112b is not in contact with the user. An inner side S1 of the appearance surface 112b is located between the contact surface 112a and an outer side S2 of the appearance surface 112b. The optical-mechanical module 120a is located between the contact surface 112a and the inner side S1 of the appearance surface 112b. In order to ensure heat energy at a high temperature is not transmitted out through the contact surface 112a to discomfort the user, the wearable projection device 100a provided in this embodiment further includes a heat insulation structure 160, where the heat insulation structure 160 is disposed between the optical-mechanical module 120a and the contact surface 112a. The heat insulation structure 160 includes a structural layer 162 and an air layer 164, where the air layer 164 is located between the contact surface 112a and the structural layer 162, and the structural layer 162 is located between the optical-mechanical module 120a and the contact surface 112a. It should be further explained that the structural layer 162 is formed between the appearance surface 112b and the contact surface 112a by extending the display portion 112, and the structural layer 162 may completely overlap one side of the optical-mechanical module 120a corresponding to the contact surface 112a. A heat insulation principle of the air layer 164 is to form a closed space between the structural layer 162 and the contact surface 112a, so as to achieve the maximum heat insulation effect by not allowing the air to flow. Preferably, a thermal conductivity coefficient of the structural layer 162 is, for instance, less than or equal to 0.3 W/mK, and a thickness of the air layer 164 is, for instance, greater than or equal to 0.2 mm. In an embodiment, a material of the contact surface 112a of the display portion 112 may be different from a material of the appearance surface 112b of the display portion 112, where a thermal conductivity coefficient of the contact surface 112a is, for instance, less than or equal to 0.3 W/mK, and a thermal conductivity coefficient of the appearance surface 112b is, for instance, greater than or equal to 1 W/mK.

Next, with reference to FIG. 1C and FIG. 2A, the support portion 114 of the main body 110 has a contact surface 114a and an appearance surface 114b opposite to each other. Here, the contact surface 114a is a surface that contacts the skin of the user when the user wears the wearable projection device 100a, while the appearance surface 114b is not in contact with the user. An inner side S3 of the appearance surface 114b is located between the contact surface 114a and an outer side S4 of the appearance surface 114b. The first thermally conductive plate 140 is located between the contact surface 114a and the inner side S3 of the appearance surface 114b. In order to ensure heat energy at a high temperature is not transmitted out through the contact surface 114a to discomfort the user, the wearable projection device 100a provided in this embodiment further includes a heat insulation structure 165 that is disposed between the contact surface 114a and the inner side S3 of the appearance surface 114b and includes a structural layer 167 and an air layer 169. The air layer 169 is located between the contact surface 114a and the structural layer 167, and the structural layer 167 is located between the air layer 169 and the first thermally conductive plate 140. It should be further explained that the structural layer 167 is formed between the appearance surface 114b and the contact surface 114a by extending the support portion 114. A heat insulation principle of the air layer 169 is to form a closed space between the structural layer 167 and the contact surface 114a, so as to achieve the maximum heat insulation effect by not allowing the air to flow. Preferably, a thermal conductivity coefficient of the structural layer 167 is, for instance, less than or equal to 0.3 W/mK, and a thickness of the air layer 169 is, for instance, greater than or equal to 0.2 mm. In an embodiment, a material of the contact surface 114a of the support portion 114 may be different from a material of the appearance surface 114b of the support portion 114, where a thermal conductivity coefficient of the contact surface 114a is, for instance, less than or equal to 0.3 W/mK, and a thermal conductivity coefficient of the appearance surface 114b is, for instance, greater than or equal to 1 W/mK.

Next, as shown in FIG. 1D, in the present embodiment, the at least one light source 122 of the optical-mechanical module 120a is adapted to emit an illumination beam L1, and the optical-mechanical module 120a further includes an imaging module 125 and a lens module 128. The imaging module 125 is disposed on a transmission path of the illumination beam L1 and configured to convert the illumination beam L1 into the image beam L2. The lens module 128 is disposed on a transmission path of the image beam L2 and configured to project the image beam L2 toward the waveguide module 130. The imaging module 125 includes at least one lens and an imaging device. The at least one lens is configured to transmit the illumination beam L1, and the imaging device is, for instance, a light valve configured to convert the illumination beam L1 into the image beam L2. The lens module 128 has at least one lens configured to project the image beam L2 to the waveguide module 130, for instance.

With reference to FIG. 2A, FIG. 2B, and FIG. 2C, in the present embodiment, the at least one light source 122 of the optical-mechanical module 120a may be fixed to the first thermally conductive plate 140 through a thermally conductive material 170. Here, one light source 122 is schematically shown, which means that the wearable projection device 100a is embodied to perform a display function in a monochromic manner. To be specific, the wearable projection device 100a provided in this embodiment further includes a thermally conductive material 172, where the first thermally conductive plate 140 is fixed to the inner side S3 of the appearance surface 114b by the thermally conductive material 172, and the first thermally conductive plate 140 is not in contact with the contact surface 114a. The first thermally conductive plate 140 is embodied in form of extending from the display portion 112 of the main body 110 to the support portion 114; that is, the area occupied by the first thermally conductive plate 140 is relatively large, thereby increasing the heat dissipation area. A thermal conductivity coefficient of the thermally conductive materials 170 and 172 is, for instance, greater than or equal to 0.5 W/mK. The at least one light source 122 is the main heat source in the display portion 112 of the main body 110, and the lower the temperature of the at least one light source 122, the higher the brightness output by the at least one light source 122. Since the first thermally conductive plate 140 provided in this embodiment extends from the display portion 112 to the support portion 114, and the at least one light source 122 may be fixed to the first thermally conductive plate 140 by the thermally conductive material 170, the heat energy generated by the at least one light source 122 may be transmitted from the display portion 112 to the support portion 114 through the first thermally conductive plate 140, so that the heat energy may be transmitted to the appearance surface 114b for heat dissipation more effectively. As such, the wearable projection device 100a provided in this embodiment may achieve an improved heat dissipation effect and have an improved display quality.

Moreover, the control module 150a provided in this embodiment is disposed at the support portion 114 of the main body 110, where the control module 150a is configured to drive the optical-mechanical module 120a and may simultaneously process input image data, user's commands, data obtained from network transmission, or the like. In this embodiment, the control module 150a further includes a temperature sensing element 152 and a predetermined temperature. The temperature sensing element 152 senses the optical-mechanical module 120a to generate a sensed temperature. When the sensed temperature is greater than the predetermined temperature, the control module 150a drives the optical-mechanical module 120a to reduce the brightness of the at least one light source 122, so as to prevent the contact surface 114a from having an excessively high temperature and causing discomfort to the user. As shown in FIG. 2A and FIG. 2C, the wearable projection device 100a provided in this embodiment further includes thermally conductive materials 174 and 175 and a third thermally conductive plate 148, where the control module 150a is connected to the third thermally conductive plate 148 by the thermally conductive material 174, the third thermally conductive plate 148 is fixed to the inner side S3 of the appearance surface 114b by the thermally conductive material 175, and the third thermally conductive plate 148 is not in contact with the contact surface 114a. Here, the third thermally conductive plate 148 is not in contact with the first thermally conductive plate 140, so as to prevent the heat dissipation effect from being reduced by mutual transfer of heat.

With reference to FIG. 1A and FIG. 1C, the support portion 114 of the main body 110 is a region for placing the wearable projection device 100a on the user's ears. In view of the different body sizes of each user, the support portion 114 is required to have an adjustable mechanism or a bendable design. Hence, the wearable projection device 100a provided in this embodiment further includes two sleeves 180 and a soft belt 185, each of the sleeves 180 may connect the structures of the corresponding support portion 114 and display portion 112, two ends of the soft belt 185 are respectively connected to the two sleeves 180, and the soft belt 185 is in contact with the back of the user's head. The user may adjust a length of the soft belt 185, so that the support portion 114 is bent to different angles to match the head shapes of respective users. Since the support portion 114 may be bent to different angles, the first thermal guide plate 140 that is in contact with the support portion 114 is preferably bendable or flexible and may be restored to the original shape even after the shape of the support portion 114 is changed.

In short, in the wearable projection device 100a provided in this embodiment, the first thermally conductive plate 140 is connected to the at least one light source 122 and extends from the display portion 112 to the support portion 114; that is, the area occupied by the first thermally conductive plate 140 is relatively large, thereby increasing the heat dissipation area and ensuring the wearable projection device 100a provided in this embodiment to achieve the improved heat dissipation effect and have the improved display quality.

Other embodiments are provided below for explanation. Note that the reference numbers and some content provided in the following embodiments follows are derived from the reference numbers and the content provided in the previous embodiment, the same reference numbers serve to denote the same or similar element, and the description of the same technical content is omitted hereinafter. The omitted description may be referred to as the description provided in the previous embodiment and will not be repeated in the following embodiments.

Figure 3A:
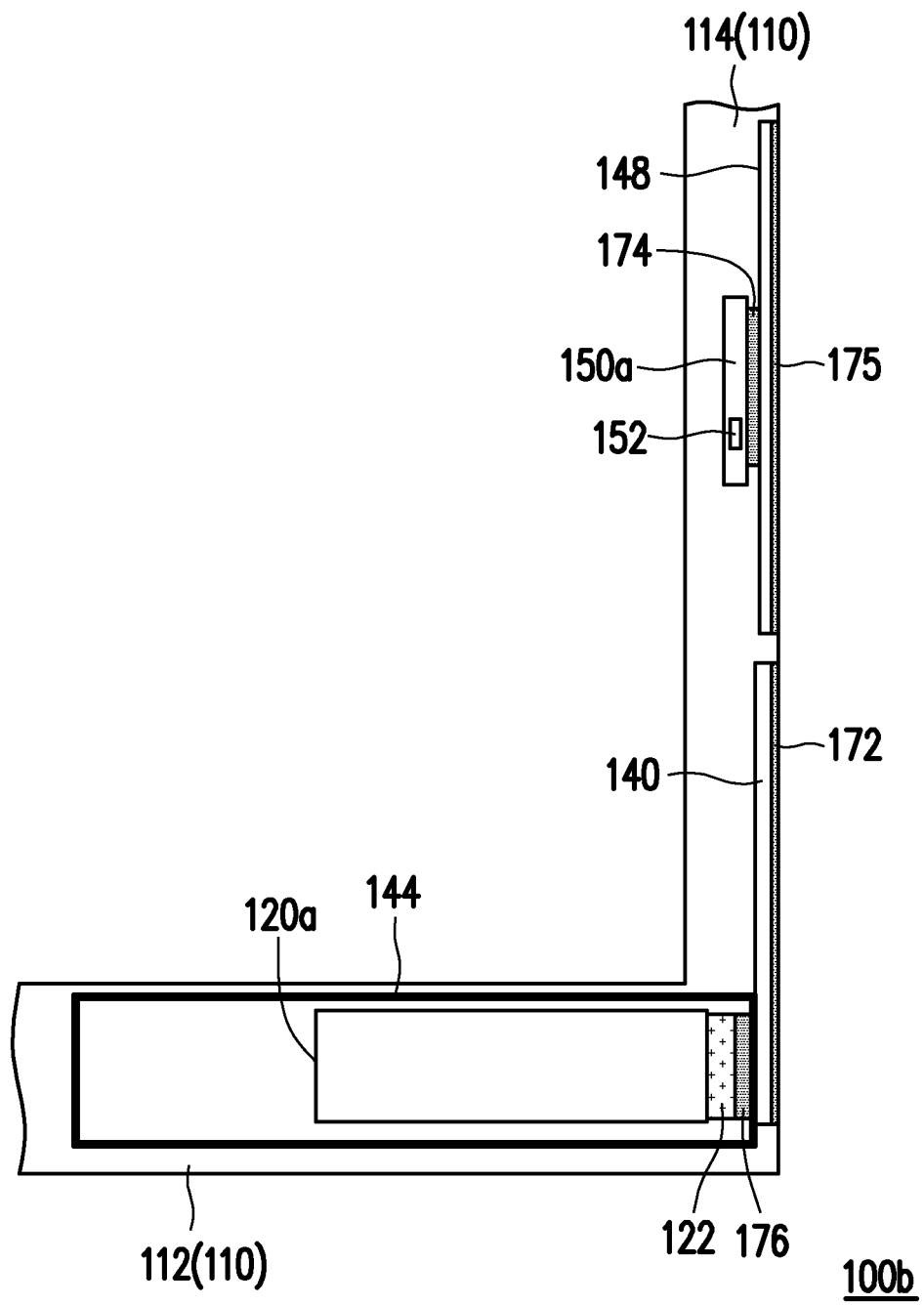
FIG. 3A is a schematic partial perspective top view illustrating a wearable projection device according to a second embodiment of the invention.
Figure 3B:
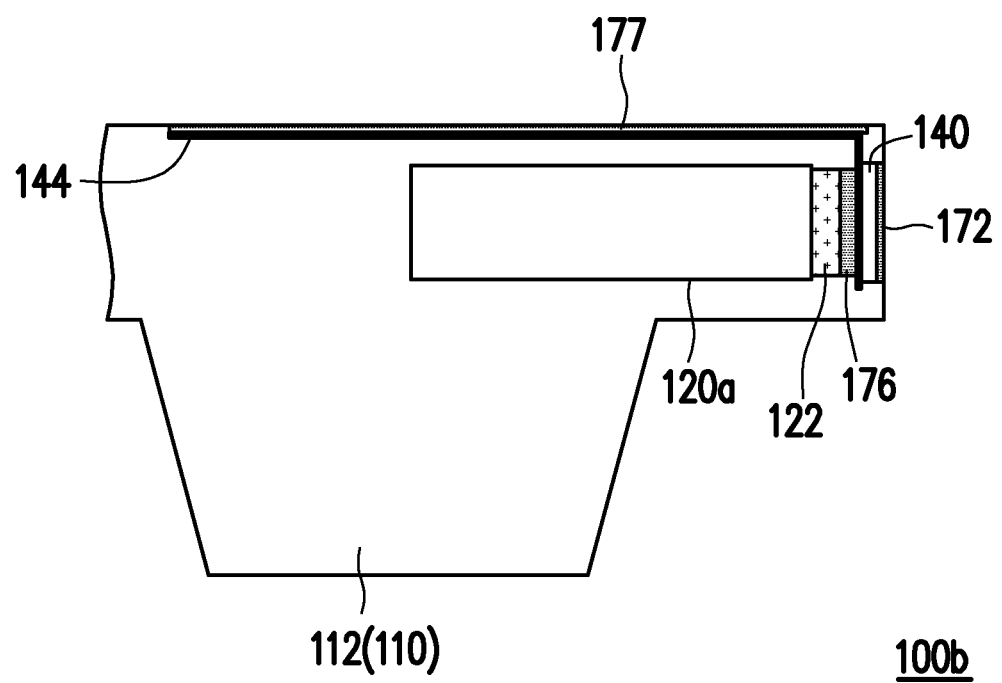
FIG. 3B is a schematic partial perspective front view illustrating the wearable projection device depicted in FIG. 3A.
Figure 3C:
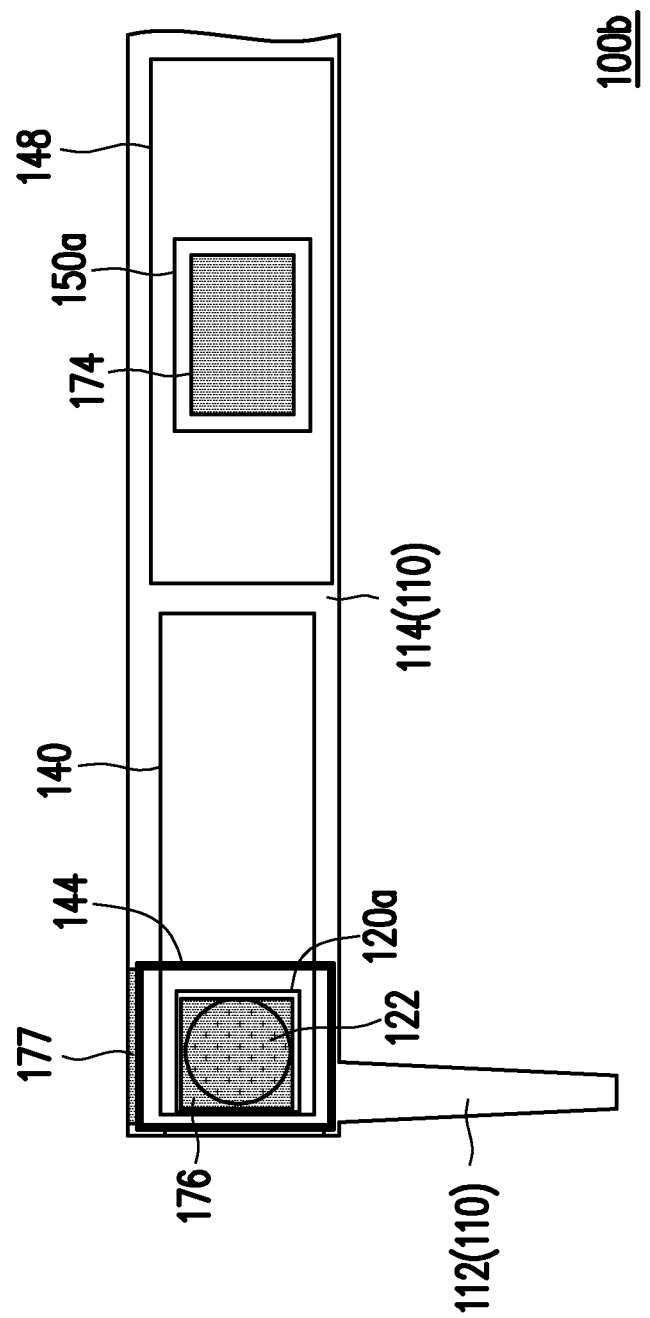
FIG. 3C is a schematic partial perspective side view illustrating the wearable projection device depicted in FIG. 3A.

FIG. 3A is a schematic partial perspective top view illustrating a wearable projection device according to a second embodiment of the invention. FIG. 3B is a schematic partial perspective front view illustrating the wearable projection device depicted in FIG. 3A. FIG. 3C is a schematic partial perspective side view illustrating the wearable projection device depicted in FIG. 3A. With reference to FIG. 2A, FIG. 3A, FIG. 3B, and FIG. 3C, a wearable projection device 100b provided in this embodiment is similar to the wearable projection device 100a depicted in FIG. 2A, while one of the differences between the wearable projection device 100b and the wearable projection device 100a lies in that the wearable projection device 100b provided in this embodiment further includes a second thermally conductive plate 144 that is disposed at the display portion 112 of the main body 110, and the second thermally conductive plate 144 is directly connected to the first thermally conductive plate 140. The at least one light source 122 is fixed to the second thermally conductive plate 144 through a thermally conductive material 176, while the second thermally conductive plate 144 is fixed to the display portion 112 through a thermally conductive material 177.

In short, the at least one light source 122 provided in this embodiment is fixed to the second thermally conductive plate 144 by the thermally conductive material 176, and the second thermally conductive plate 144 is directly connected to the first thermally conductive plate 140 and is fixed to the display portion 112 by the thermally conductive material 177. The first thermally conductive plate 140 and the second thermally conductive plate 144 are disposed to increase the heat dissipation area, so that the heat generated by the at least one light source 122 may be dissipated through the first thermally conductive plate 140 which occupies a relatively large area, and the second thermally conductive plate 140 may serve as a means of auxiliary heat dissipation. Accordingly, the wearable projection device 100b provided in this embodiment may achieve the improved heat dissipation effect and have the improved display quality.

Figure 4A:
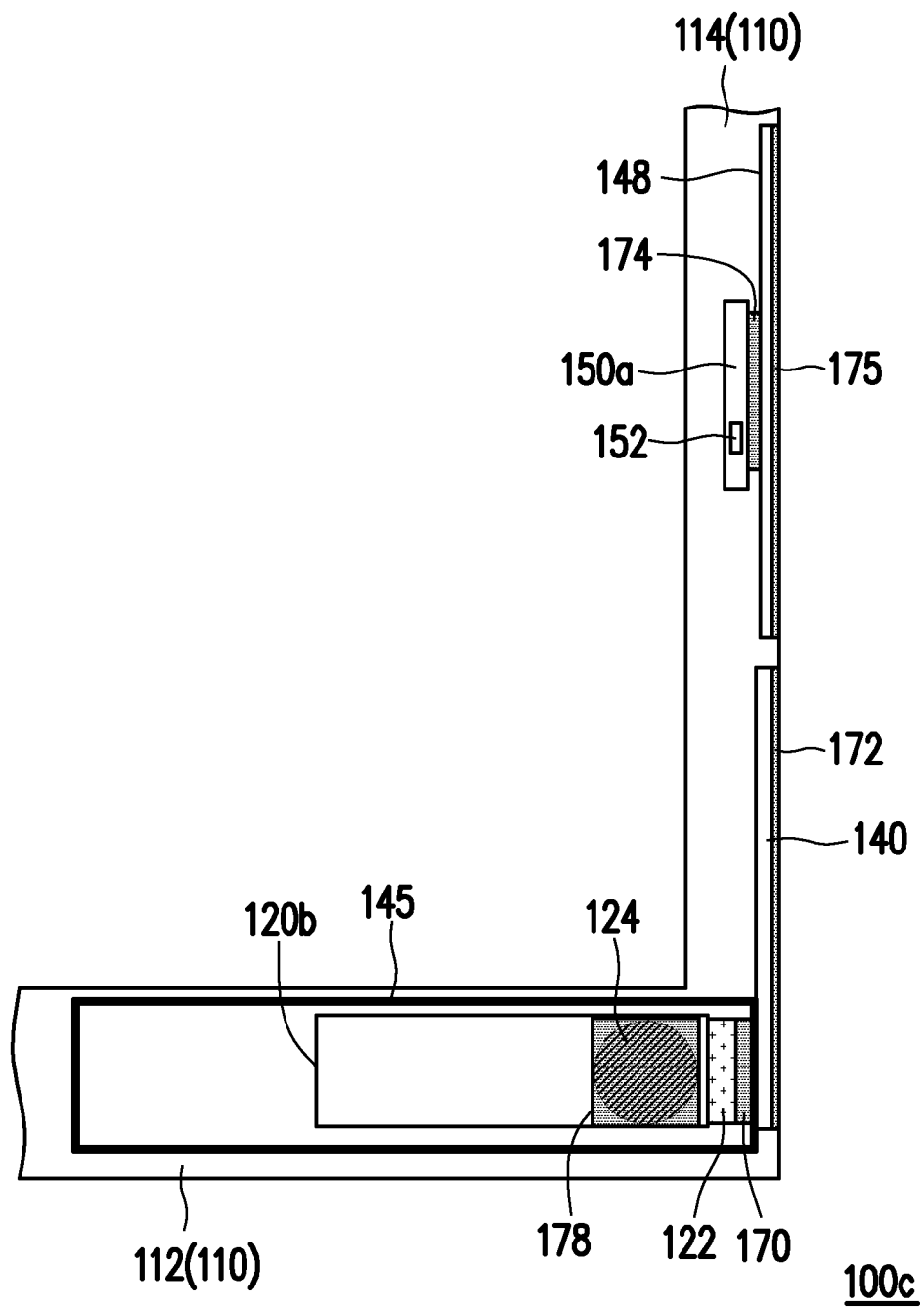
FIG. 4A is a schematic partial perspective top view illustrating a wearable projection device according to a third embodiment of the invention.
Figure 4B:
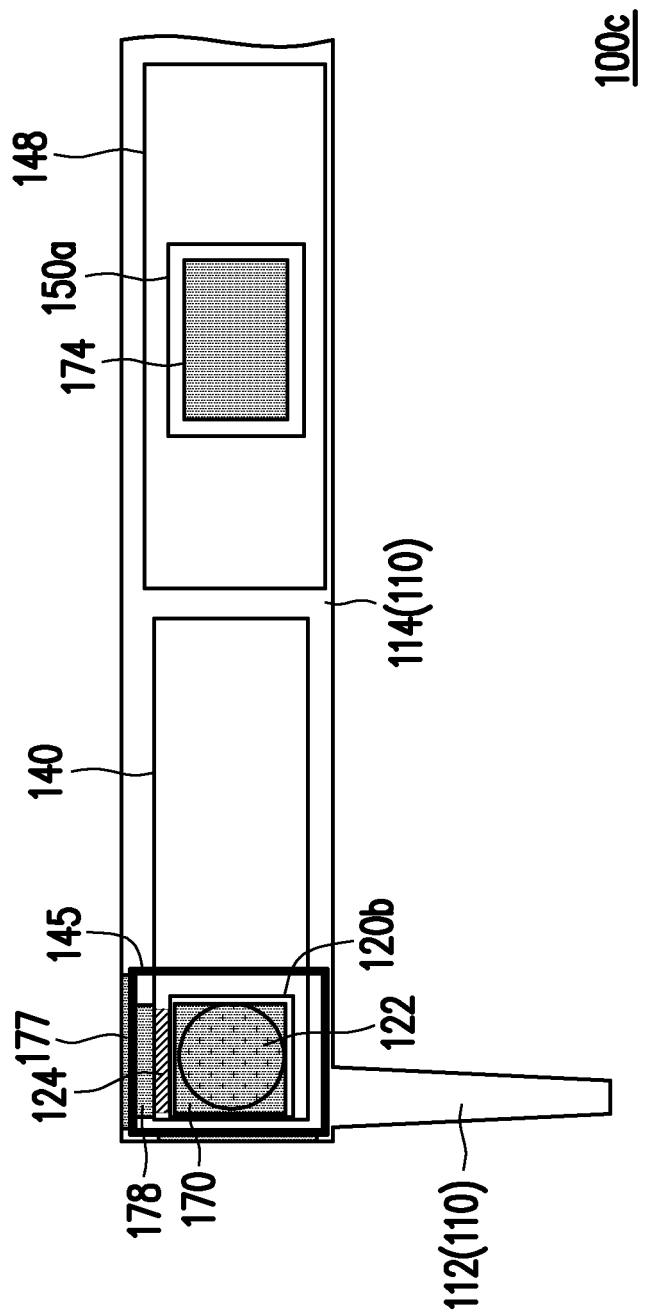
FIG. 4B is a schematic partial perspective side view illustrating the wearable projection device depicted in FIG. 4A.

FIG. 4A is a schematic partial perspective top view illustrating a wearable projection device according to a third embodiment of the invention. FIG. 4B is a schematic partial perspective side view illustrating the wearable projection device depicted in FIG. 4A. With reference to FIG. 3A, FIG. 4A, and FIG. 4B, a wearable projection device 100c provided in this embodiment is similar to the wearable projection device 100b depicted in FIG. 3A, while one of the differences between the wearable projection device 100c and the wearable projection device 100b lies in that the optical-mechanical module 120b provided in this embodiment includes a light source 122 (i.e., a first light source) and a light source 124 (i.e., a second light source). The light source 122 is connected to the first thermally conductive plate 140 by the thermally conductive material 170, and the light source 124 is connected to the second thermally conductive plate 145 by the thermally conductive material 178, where the first thermally conductive plate 140 is not connected to the second thermally conductive plate 145, so as to prevent the heat dissipation effect from being reduced by mutual transfer of heat. Here, the third thermally conductive plate 148 is not in contact the first thermally conductive plate 140 and the second thermally conductive plate 145, so as to prevent the heat dissipation effect from being reduced by mutual transfer of heat. Since the optical-mechanical module 120b provided in this embodiment includes the light source 122 and the light source 124 which may serve to generate color beams, e.g., red, green, and blue color beams, the wearable projection device 100c may perform the display function in a full-color manner.

Figure 5A:
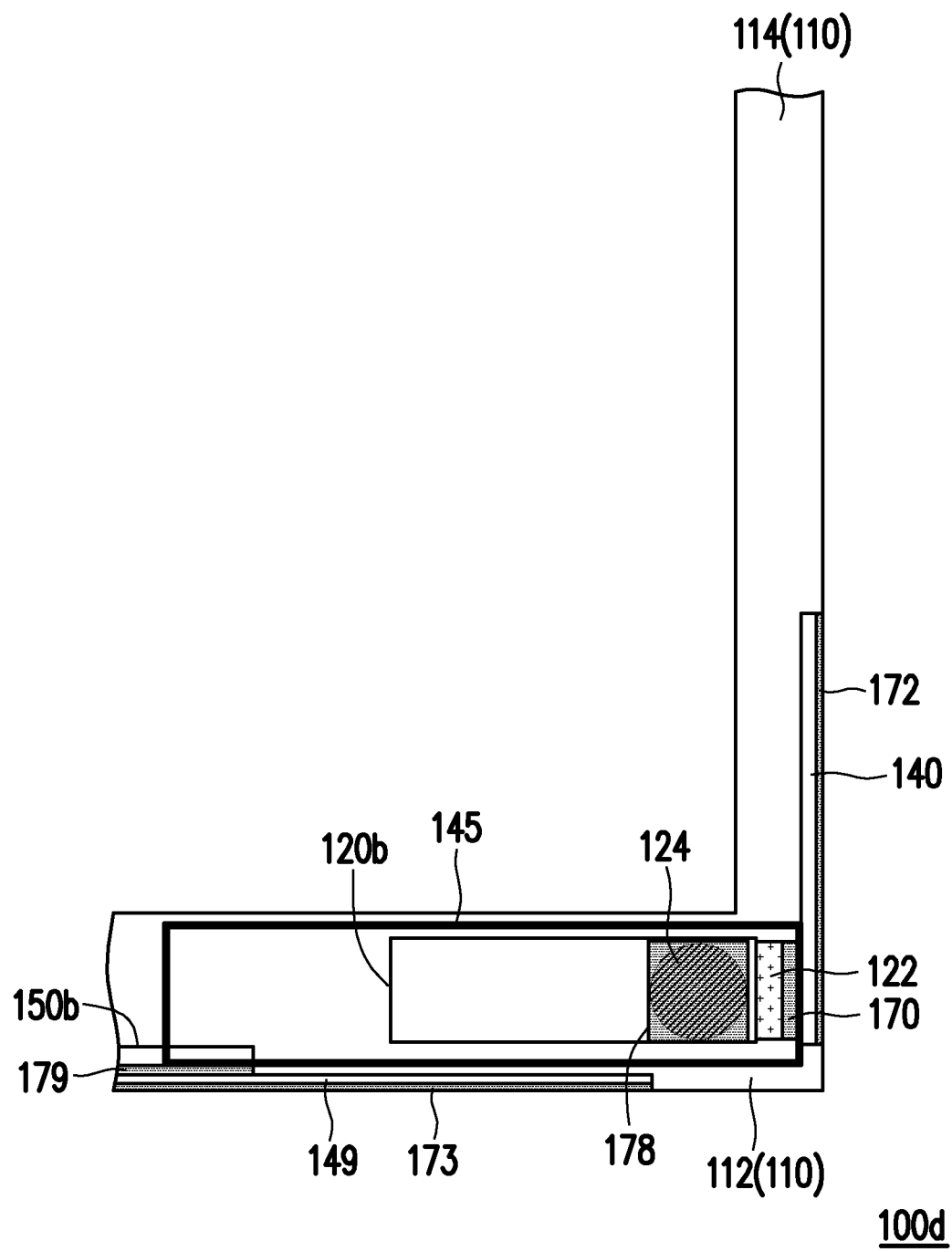
FIG. 5A is a schematic partial perspective top view illustrating a wearable projection device according to a fourth embodiment of the invention.
Figure 5B:
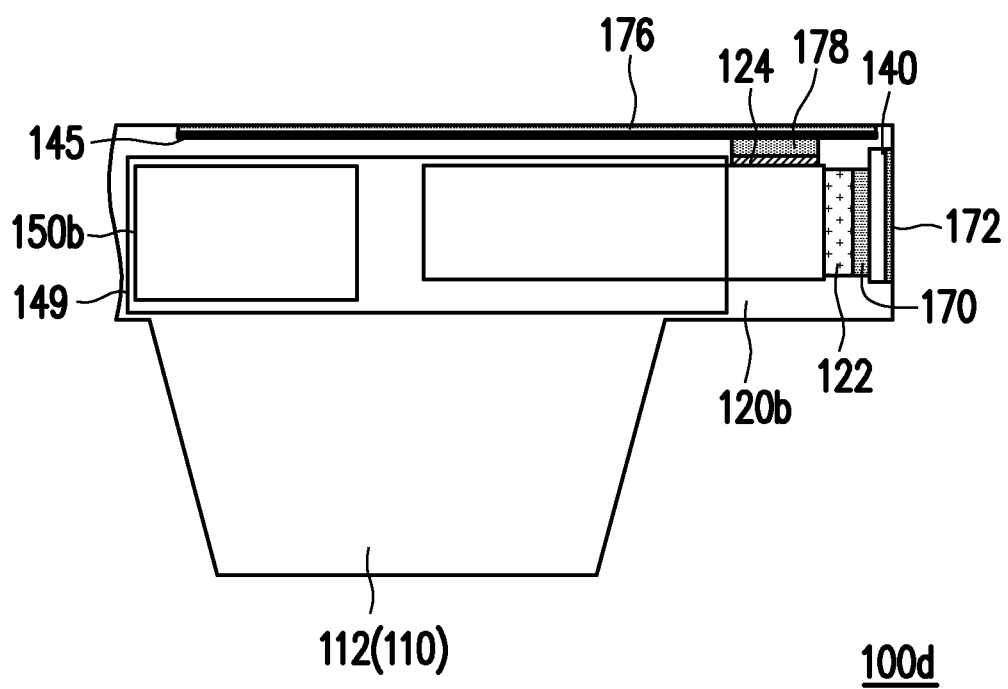
FIG. 5B is a schematic partial perspective front view illustrating the wearable projection device depicted in FIG. 5A.
Figure 5C:
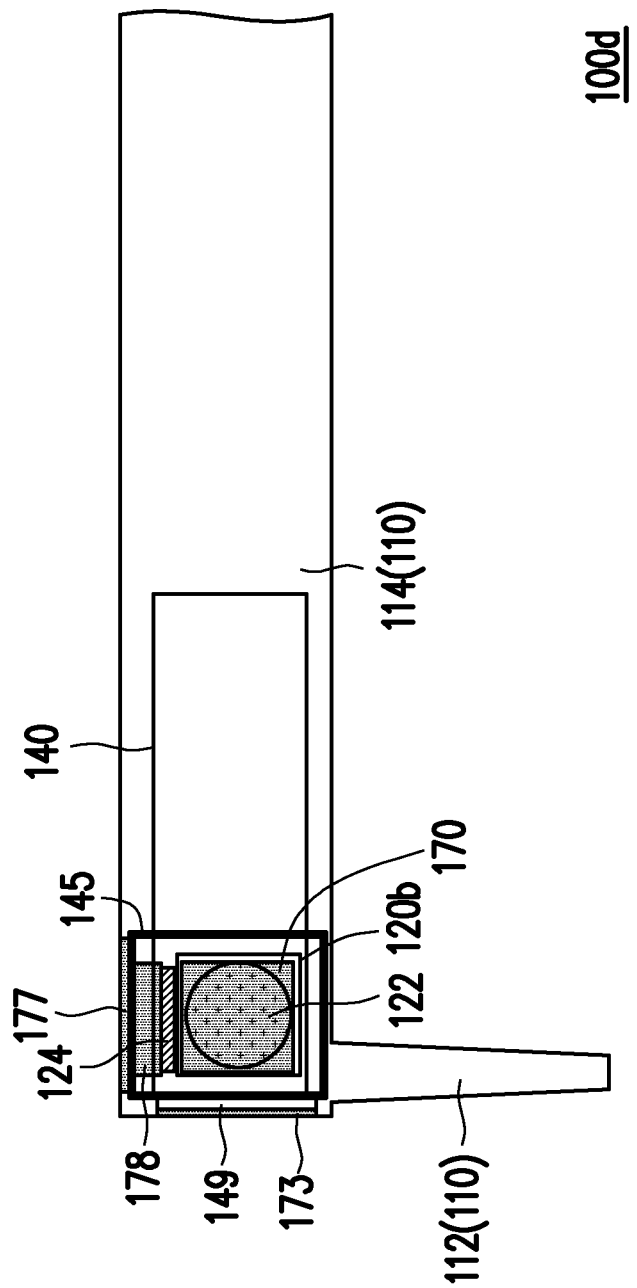
FIG. 5C is a schematic partial perspective side view illustrating the wearable projection device depicted in FIG. 5A.

FIG. 5A is a schematic partial perspective top view illustrating a wearable projection device according to a fourth embodiment of the invention. FIG. 5B is a schematic partial perspective front view illustrating the wearable projection device depicted in FIG. 5A. FIG. 5C is a schematic partial perspective side view illustrating the wearable projection device depicted in FIG. 5A. With reference to FIG. 4A, FIG. 5A, FIG. 5B, and FIG. 5C, a wearable projection device 100d provided in this embodiment is similar to the wearable projection device 100c depicted in FIG. 4A, while one of the differences between the wearable projection device 100d and the wearable projection device 100c lies in that the control module 150b provided in this embodiment is the display portion 112 disposed at the main body 110, where the control module 150b is connected to the third thermally conductive plate 149 through a thermally conductive material 179, and the third thermally conductive plate 149 is fixed to the display portion 112 of the main body 110 through a thermally conductive material 173. Here, the third thermally conductive plate 148 is not in contact with the first thermally conductive plate 140 and the second thermally conductive plate 145, so as to prevent the heat dissipation effect from being reduced by mutual transfer of heat.

To sum up, one or more embodiments of the invention may have at least one of the following advantages or achieve at least one of the following effects. In the wearable projection device provided in one or more embodiments of the invention, the first thermally conductive plate is connected to the at least one light source and extends from the display portion to the support portion. In addition, the second thermally conductive plate may be further disposed at the display portion disposed. When there is only one single light source, the second thermally conductive plate may be connected to the first thermally conductive plate, when there are two light sources, the first thermally conductive plate and the second thermally conductive plate may be connected to the first light source and the second light source, respectively. Besides, according to the location where the control module is disposed, the third thermally conductive plate may be correspondingly connected to the control module located at the support portion or the display portion. Accordingly, the first thermally conductive plate, the second thermally conductive plate, the third thermally conductive plate, or a combination thereof is arranged to increase the heat dissipation area, so that the wearable projection device provided in one or more embodiments of the invention may achieve the improved heat dissipation effect and have the improved display quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wearable projection device, comprising:
    a main body, having a display portion and a support portion connected to each other;
    an optical-mechanical module, disposed at the display portion, and including at least one light source;
    a waveguide module, disposed at the display portion;
    a first thermally conductive plate, connected to the at least one light source and extending from the display portion to the support portion;
    a thermally conductive material, disposed between the optical-mechanical module and the first thermally conductive plate, wherein the optical-mechanical module, the thermally conductive material and the first thermally conductive plate are sequentially arranged along an arranging direction, wherein
    an orthographic projection of the optical-mechanical module and an orthographic projection of the thermally conductive material along the arranging direction on the first thermally conductive plate are overlapped with the first thermally conductive plate at the display portion, and
    the orthographic projection of the optical-mechanical module and the orthographic projection of the thermally conductive material along the arranging direction on the first thermally conductive plate are not overlapped with the first thermally conductive plate at the support portion; and
    a control module, electrically connected to the optical-mechanical module, so that an image generated by the optical-mechanical module is displayed on the display portion by the waveguide module.

2. The wearable projection device according to claim 1, wherein the display portion has a contact surface and an appearance surface opposite to each other, an inner side of the appearance surface is located between the contact surface and an outer side of the appearance surface, and the optical-mechanical module is located between the contact surface and the inner side of the appearance surface.

3. The wearable projection device according to claim 2, further comprising:
    a heat insulation structure, disposed between the optical-mechanical module and the contact surface, and the heat insulation structure comprising a structural layer and an air layer, wherein the air layer is located between the contact surface and the structural layer, and the structural layer is located between the optical-mechanical module and the contact surface.

4. The wearable projection device according to claim 3, wherein a thermal conductivity coefficient of the structural layer is less than or equal to 0.3 W/mK, and a thickness of the air layer is greater than or equal to 0.2 mm.

5. The wearable projection device according to claim 2, wherein a material of the contact surface of the display portion is different from a material of the appearance surface of the display portion.

6. The wearable projection device according to claim 5, wherein a thermal conductivity coefficient of the contact surface is less than or equal to 0.3 W/mK, and a thermal conductivity coefficient of the appearance surface is greater than or equal to 1 W/mK.

7. The wearable projection device according to claim 1, wherein the support portion has a contact surface and an appearance surface opposite to each other, an inner side of the appearance surface is located between the contact surface and an outer side of the appearance surface, and the first thermally conductive plate is located between the contact surface and the inner side of the appearance surface.

8. The wearable projection device according to claim 7, wherein the first thermally conductive plate is fixed to the inner side of the appearance surface by the thermally conductive material, and the first thermally conductive plate is not in contact with the contact surface.

9. The wearable projection device according to claim 8, wherein a thermal conductivity coefficient of the thermally conductive material is greater than or equal to 0.5 W/mK.

10. The wearable projection device according to claim 8, further comprising:
a heat insulation structure, disposed between the contact surface and the inner side of the appearance surface and the heat insulation structure comprising a structural layer and an air layer, wherein the air layer is located between the contact surface and the structural layer, and the structural layer is located between the air layer and the first thermally conductive plate.

11. The wearable projection device according to claim 10, wherein a thermal conductivity coefficient of the structural layer is less than or equal to 0.3 W/mK, and a thickness of the air layer is greater than or equal to 0.2 mm.

12. The wearable projection device according to claim 7, wherein a material of the contact surface of the support portion is different from a material of the appearance surface of the support portion.

13. The wearable projection device according to claim 12, wherein a thermal conductivity coefficient of the contact surface is less than or equal to 0.3 W/mK, and a thermal conductivity coefficient of the appearance surface is greater than or equal to 1 W/mK.

14. The wearable projection device according to claim 1, wherein the first thermally conductive plate is flexible.

15. The wearable projection device according to claim 1, further comprising:
a second thermally conductive plate, disposed at the display portion, wherein the second thermally conductive plate is connected to the at least one light source or both of the at least one light source and the first thermally conductive plate.

16. The wearable projection device according to claim 15, wherein the at least one light source comprises a first light source and a second light source, the first light source is connected to the first thermally conductive plate, the second light source is connected to the second thermally conductive plate, and the first thermally conductive plate is not connected to the second thermally conductive plate.

17. The wearable projection device according to claim 15, further comprising:
a third thermally conductive plate, wherein the control module is connected to the third thermally conductive plate by the thermally conductive material.

18. The wearable projection device according to claim 17, wherein the third thermally conductive plate is not in contact with the first thermally conductive plate and the second thermally conductive plate.

19. The wearable projection device according to claim 1, further comprising:
a third thermally conductive plate, wherein the control module is connected to the third thermally conductive plate by the thermally conductive material.

20. The wearable projection device according to claim 19, wherein the third thermally conductive plate is not in contact with the first thermally conductive plate.

21. The wearable projection device according to claim 1, wherein the control module further comprises a temperature sensing element.

22. The wearable projection device according to claim 21, wherein the control module further comprises a predetermined temperature, the temperature sensing element senses the optical-mechanical module to generate a sensed temperature, and when the sensed temperature is greater than the predetermined temperature, the control module drives the optical-mechanical module to reduce a brightness of the at least one light source.

23. The wearable projection device according to claim 1, wherein the at least one light source is adapted to emit an illumination beam, and the optical-mechanical module further comprises:
an imaging module, disposed on a transmission path of the illumination beam and configured to convert the illumination beam into an image beam; and
a lens module, disposed on a transmission path of the image beam and configured to project the image beam toward the waveguide module.

24. The wearable projection device according to claim 1, wherein the control module is disposed to the display portion or the support portion.

* * * * *